Patented Nov. 19, 1946

2,411,159

UNITED STATES PATENT OFFICE 2,411,159

LUBRICANT

William Edward Hanford, Easton, Pa., assignor to E. I. du Pont de Nemours & Company, Wilmington, Del., a corporation of Delaware No Drawing. Application July 22, 1943,
Serial No. 495,767

13 Claims. (Cl. 252—29)

This invention relates to a new class of stable fluorine-containing lubricants.

Lubricating oils, transformer oils and other refined mineral oils suffer a marked deterioration in use and when exposed to air at elevated temperatures. Generally, such petroleum oils when in use darken in color and eventually may become saturated and deposit a finely divided oil-insoluble carbonaceous material, commonly known as sludge. Under some conditions, the oils deposit an insoluble film on hot metal surfaces. Such oils, in addition, develop an acidity after some period of use, particularly when used under high temperature conditions. In attempts to prevent this deterioration of lubricating or transformer oils, use has been made of oxidation inhibitors. Such materials are useful for a short time, but they themselves are soon oxidized and lose their effectiveness.

It is an object of the present invention to provide very stable, highly fluorinated lubricants. A further object is the preparation of very stable, highly fluorinated non-flammable lubricants for the purpose of lubricating moving parts under extreme conditions such as those imposed at elevated temperatures, at extreme pressures, or by corrosive chemicals and the like. It is a principal object of the invention, therefore, to provide lubricating compositions characterized by the afore-mentioned improvements. Additional objects will become apparent from an examination of the following description and claims.

These and other objects and advantages are accomplished by a lubricant comprising the reaction product of tetrafluoroethylene and a non-polymerizable organic compound as more fully described hereinafter.

The reaction products of tetrafluoroethylene prepared by reacting tetrafluoroethylene at a temperature between 50° C. and 350° C. with a saturated non-polymerizable organic compound of the general formula XY, wherein X is a member of the group consisting of hydrogen and halogen and Y is a monovalent saturated organic radical, have been found to be exceptionally stable, non-flammable lubricants. Said products, which are preferably prepared in a closed system and in the presence of a catalyst, have the general formula $X(CF_2CF_2)_nY$ in which X is a member of the group consisting of hydrogen and halogen, $n$ is a positive integer greater than 1 and Y is the complementary portion of the organic reactant, being a monovalent saturated organic radical. The fluoro-carbon atom chain present in these products contributes to their extreme stability and the terminal substituents contribute to their lubricating properties. The phrase "non-polymerizable organic compound" designates any organic compound containing one or more carbon atoms which is free from ethylenic or acetylenic unsaturation.

The preferred stable lubricating compositions of this invention vary from relatively high boiling liquids to solids melting below 300 C. which have molecular weights within the range of from 250 to 2500 and contain from about 60 to 75 per cent of fluorine.

The following examples are given by way of illustration of the superior lubricating properties of these lubricants, but since the conditions may be varied I do not wish to be limited to the exact apparatus, machine or other conditions mentioned.

EXAMPLE I

The film strengths of a number of reaction products of tetrafluoroethylene with various non-polymerizable compounds were compared with that of a commercial SAE 30 oil by applying them directly to the bearing of a Cornell friction tester and noting the jaw load on said tester at which seizure occurred. The Cornell friction tester is described in U. S. Patent 2,279,560. These materials exhibited film strengths superior to the SAE 30 oil as shown in the following table.

Table I

| Reactant | Approximate melting or boiling point of product | Jaw load on Cornell friction tester at seizure |
|---|---|---|
| | | Pounds |
| Dioxane | M. P. 170–175° C. | 2,250 |
| Do | M. P. 75–90° C. (F, 64.6%) | 1,600 |
| 1,2-dimethoxyethane | M. P. 80° C. | 1,250 |
| Do | M. P. 120° C. | 2,500 |
| Ethyl propionate | Soft low melting solid | 1,375 |
| n-Butyric acid | Sticky low melting solid | 3,000 |
| Cyclohexane | M. P. 90–120° C. | 1,750 |
| n-Butane | M. P. 125° C. (F, 70.3%) | 2,000 |
| Chloroform | M. P. 290–295° C. | 2,000 |
| Control SAE 30 oil | | 750 |

EXAMPLE II

The reaction products of tetrafluorethylene with non-polymerizable organic compounds improved the film strength of an ordinary commercial SAE 30 oil when added to the oil in the amount of only one per cent as shown by the following table which records the jaw load at which seizure occurred when a commercial SAE 30 oil containing 1% by weight of a reaction product of tetrafluoroethylene with a non-polymerizable reactant was applied directly to the bearing of a Cornell friction tester.

*Table II*

| Reactant | Approximate melting or boiling point of product | Jaw load on Cornell machine at seizure |
|---|---|---|
| | | *Pounds* |
| Dioxane | M. P. 75–90° C. (F, 64.6%) | 1,250 |
| Do | B. P. 177–190° C | 1,250 |
| Do | B. P. 211–230° C | 1,125 |
| Cyclohexane | B. P. 86–92° C/42 mm | 1,250 |
| Do | B. P. 127–145° C./42 mm | 1,250 |
| Control SAE 30 oil | | 800 |

EXAMPLE III

Considerable difficulty was encountered on attempting to distill or store corrosive chemicals such as antimony trichloride, antimony pentachloride, and boron trifluoride in glass apparatus containing ground glass joints or stopcocks due to the rapid attack of the chemicals on the commercial lubricants causing sticking or freezing of the joints. A glass apparatus containing numerous ground glass joints and stopcocks which was designed for distilling and storing corrosive chemicals such as aluminum bromide, boron trifluoride, and antimony halides was found to be practically inoperable using the highest grade commercial lubricants due to the rapid sticking and freezing of the glass joints which actually occurred in a few hours. However, when the joints were lubricated with a mixture of graphite and H(CF$_2$CF$_2$)$_n$C$_4$H$_9$, where $n$ averaged about 7, the ground glass joints and stopcocks operated smoothly for over a week while distilling aluminum bromide under high vacuum. This lubricant was also superior to commercial lubricants in that it was unattacked by the corrosive chemicals and imparted no color or contamination to the purified materials. Similar results were obtained when the stopcocks, present in an apparatus used for the storage of bromine, were lubricated with this material.

The present invention comprises the discovery of a new class of stable lubricants which are applicable for use on bearing surfaces, e. g. on metals, glass, ceramics, plastics, wood, leather, or other materials. The lubricating compounds which are the subject of this invention may be represented by the formula X(CF$_2$CF$_2$)$_n$Y, where X is hydrogen or halogen, XY constitutes a non-polymerizable organic compound and $n$ is a positive integer greater than 1 which generally varies from 2 to about 25. In the preferred products, because of the superior results thereby obtained, $n$ is in the range of 2 to 15. In view of their greater utility, the preferred products are liquids or solids which melt below 300° C. and contain at least 60% fluorine by weight. The following examples are given to illustrate the preparation of the compounds.

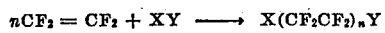

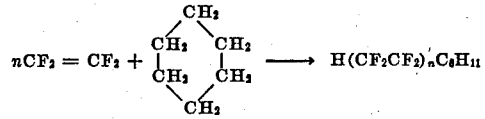

Since the structure of these products has not been definitely determined, it is possible that a large variety of isomeric products are obtained in which all the tetrafluoroethylene units are not necessarily connected together. For example, the above products may react with more tetrafluoroethylene as illustrated below:

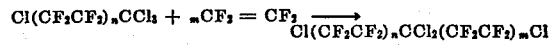

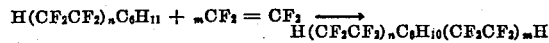

However, it will be observed that the sum total of the atoms other than those in the tetrafluoroethylene units is equivalent to one unit of the original non-polymerizable organic compound XY.

The saturated non-polymerizable organic compounds include acids, esters, anhydrides, nitriles, amides, imides, ketones, aldehydes, acetals, ketals, alcohols, glycols, hydrocarbons, ethers, mercaptans, sulfides and disulfides. The compounds mentioned above may be straight or branched chains or may be cyclic. The preferred type of non-polymerizable organic compounds for preparing stable lubricants from tetrafluoroethylene are saturated aliphatic hydrocarbons. Examples of said hydrocarbons are methane, ethane, propane, n-butane, isobutane, cyclohexane, pentanes, hexanes, saturated petroleum hydrocarbons, and isooctane. These reaction products are exceptionally stable and exhibit excellent lubricating properties.

The lubricants of this invention have many distinct advantages over the commercial mineral oils including non-flammability, extreme thermal and chemical stability, freedom from acidity, deterioration, or sludge formation even under extended severe conditions of elevated temperatures or pressures, and their relatively low viscosity also facilitates their rapid circulation and penetration between metal, glass, or other surfaces. Two samples of H(CF$_2$CF$_2$)$_n$C$_4$H$_9$ where $n$ averaged about 3 and 7 were passed through a 26-inch furnace which was heated to 500–550° C. and the color and lubricating properties of the heated samples remained unchanged.

The lubricants vary from liquids to waxy solids which makes them applicable as lubricants for moving parts in a wide variety of different machines and apparatus. The liquid lubricants are particularly useful as lubricating oils where the lubricant may be subjected to extreme conditions such as elevated temperatures, for example in internal combustion engines of the spark and compression-ignition types, such as airplane, Diesel, marine and automobile engines; as well as for cutting oils, turbine lubricants, wire-drawing lubricants, etc. They are also applicable as stable insulating and lubricating oils in transformers, switch boxes and the like. The higher molecular weight waxy lubricants may be applied directly to the bearing surfaces or may be blended with the high boiling liquid lubricants to give greases which are particularly adapted for use as lubricants for metal or glass surfaces. A few specific examples of uses for which these lubricants are especially suited include ammunition lubrication, glass stopcock lubricants, mill greases, extreme pressure lubricants, cutting oils and as lubricants for various types of electrical motors. They may be employed as lubricants alone or in conjunction with other oils, lubricants, or agents added to the oil for various purposes such as fatty acid esters, organic phosphites, organic phosphates, halogenated aromatic compounds, pour point depressants, viscosity index improving agents, anti-ring sticking agents and the like.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. A lubricating composition comprising the reaction product of tetrafluoroethylene with a saturated non-polymerizable organic compound of the general formula XY where X is a member selected from the group consisting of hydrogen and halogen and Y is a monovalent saturated organic radical, said reaction product consisting of from two to about 25 tetrafluoroethylene units per unit of organic compound.

2. A lubricating composition comprising a saturated organic polyfluoro compound of the general formula $X(CF_2CF_2)_nY$ in which X is a member selected from the group consisting of hydrogen and halogen, $n$ is a positive integer greater than 1, and Y is a monovalent saturated organic radical.

3. A lubricating composition comprising a saturated organic polyfluoro compound containing at least 60% fluorine and having the general formula $X(CF_2CF_2)_nY$ in which X is a member selected from the group consisting of hydrogen and halogen, $n$ is a positive integer greater than 1, and Y is a monovalent saturated organic radical.

4. A lubricating composition comprising a saturated organic polyfluoro compound which contains at least 60% fluorine, has a melting point of less than 300° C., and is of the general formula $X(CF_2CF_2)_nY$ in which X is a member selected from the group consisting of hydrogen and halogen, $n$ is a positive integer greater than 1, and Y is a monovalent saturated organic radical.

5. A lubricating composition comprising a saturated organic polyfluoro compound of the general formula $H(CF_2CF_2)_nY$ in which $n$ is a positive integer greater than 1 and Y is a monovalent saturated hydrocarbon radical.

6. A lubricating composition comprising a saturated organic polyfluoro compound of the general formula $H(CF_2CF_2)_nC_4H_9$ in which $n$ is a positive integer greater than 1.

7. A lubricating composition comprising a saturated organic polyfluoro compound of the general formula $H(CF_2CF_2)_nC_4H_9$ in which $n$ is about 7.

8. A lubricating composition comprising a lubricating oil and a saturated organic polyfluoro compound of the general formula $X(CF_2CF_2)_nY$ wherein X is a member selected from the group consisting of hydrogen and halogen, $n$ is a positive integer greater than 1, and Y is a monovalent saturated organic radical.

9. A lubricating composition comprising a lubricating oil and a saturated organic polyfluoro compound which contains from about 60% to 75% of fluorine, has a melting point of less than 300° C. and a molecular weight within the range of from 250 to 2500, and is of the general formula $H(CF_2CF_2)_nY$ wherein $n$ is a positive integer within the range of from 2 to 15 and Y is a monovalent saturated hydrocarbon radical.

10. A lubricating composition comprising a lubricating oil and a saturated organic polyfluoro compound of the general formula $$H(CF_2CF_2)_nC_4H_9$$

wherein $n$ is about 7.

11. A lubricating composition comprising graphite and a saturated organic polyfluoro compound of the general formula $X(CF_2CF_2)_nY$ wherein X is a member selected from the group consisting of hydrogen and halogen, $n$ is a positive integer greater than 1, and Y is a monovalent saturated organic radical.

12. A lubricating composition comprising graphite and a saturated organic polyfluoro compound which contains from about 60% to 75% of fluorine, has a melting point of less than 300° C. and a molecular weight within the range of from 250 to 2500, and is of the general formula $H(CF_2CF_2)_nY$ wherein $n$ is a positive integer within the range of from 2 to 15 and Y is a monovalent saturated hydrocarbon radical.

13. A lubricating composition comprising graphite and a saturated organic polyfluoro compound of the general formula $H(CF_2CF_2)_nC_4H_9$ wherein $n$ is about 7.

WILLIAM EDWARD HANFORD.